United States Patent [19]

LeClair et al.

[11] Patent Number: 5,768,487
[45] Date of Patent: Jun. 16, 1998

[54] SYSTEM AND METHOD USING A SPLIT PRINTER DRIVER TO CONTROL A COMPUTER PRINTER DEVICE

[75] Inventors: Gregory A. LeClair, San Jose, Calif.; Kazuo Nakamura, Shiojiri, Japan

[73] Assignee: Seiko Epson Corporation, Tokyo, Japan

[21] Appl. No.: 550,749

[22] Filed: Oct. 31, 1995

[51] Int. Cl.⁶ .................................................. G06K 15/00
[52] U.S. Cl. ............................................ 395/116; 395/112
[58] Field of Search .................................... 395/101, 112, 395/114, 115, 116, 827, 826, 834, 840, 841, 872, 874, 876; 345/519, 522, 526, 507, 512

[56] References Cited

U.S. PATENT DOCUMENTS

| | | |
|---|---|---|
| 3,828,319 | 8/1974 | Owen et al. . |
| 4,203,154 | 5/1980 | Lampson et al. . |
| 4,752,894 | 6/1988 | Deering et al. . |
| 4,977,519 | 12/1990 | Chang et al. . |
| 4,984,182 | 1/1991 | Chang et al. . |
| 4,992,956 | 2/1991 | Kaku et al. . |
| 5,043,918 | 8/1991 | Murahashi . |
| 5,084,831 | 1/1992 | Morikawa et al. . |
| 5,111,218 | 5/1992 | Lebeau et al. . |
| 5,125,072 | 6/1992 | Ng . |
| 5,129,048 | 7/1992 | Ng . |
| 5,136,688 | 8/1992 | Morikawa et al. . |
| 5,138,561 | 8/1992 | Crowe . |
| 5,150,456 | 9/1992 | Wu et al. . |
| 5,206,932 | 4/1993 | Chang et al. . |
| 5,218,670 | 6/1993 | Sodek, Jr. et al. . |
| 5,337,258 | 8/1994 | Dennis . |
| 5,355,441 | 10/1994 | Kawai et al. . |
| 5,410,672 | 4/1995 | Sodek, Jr. et al. . |
| 5,471,564 | 11/1995 | Dennis ............................. 395/114 |

FOREIGN PATENT DOCUMENTS

| | | |
|---|---|---|
| 0 578 256 | 1/1994 | European Pat. Off. . |
| 0 578 264 | 1/1994 | European Pat. Off. . |

*Primary Examiner*—Arthur G. Evans
*Attorney, Agent, or Firm*—Michael T. Gabrik

[57] ABSTRACT

A split printer driver comprising a separate page driver for optimizing and storing print data into a journal file, a journal file processor for retrieving the optimized print data from the journal file, and a separate render driver for receiving the optimized print data from the journal file processor, processing the optimized print data using an image processor, rendering the optimized print data into picture elements, and providing the picture elements to a printer to produce high-quality printed images.

17 Claims, 12 Drawing Sheets

SYSTEM AND METHOD USING A SPLIT PRINTER DRIVER TO CONTROL A COMPUTER PRINTER DEVICE

CROSS-REFERENCE TO RELATED APPLICATION

This application is related to a co-pending application also filed on this date entitled "Computer Calibration Of A Color Print Image Using Successive Refinement", serial #, by inventor Gregory A. LeClair, which subject matter is incorporated herein by reference. Both of these related applications have been commonly assigned to Seiko Epson Corporation of Japan.

BACKGROUND OF THE INVENTION

1. Field of the Invention

This invention relates generally to control of computer printers and more particularly to a system and method using a split printer driver to control a computer printer device.

2. Description of the Prior Art

Producing high-quality printed images using computer systems is an important goal of many computer users as well as computer system manufacturers. The computer printer and the printer driver are critical elements in achieving high-quality printed images. The printer driver software and associated hardware receive print data from a host computer system and provide the print data to a peripheral printer in the appropriate format.

As computer technology has become more sophisticated, the demand for computer printers with higher resolution and greater color reproduction capability has also increased. Higher resolution and greater color capacity typically require larger amounts of computer memory and longer computer processing times. These increased technological demands of high-resolution color printing frequently impair printing job throughput and impact negatively on computer system performance. Implementation of computer printing devices has thus become a significant consideration in achieving optimal computer system performance.

Attempts to produce high-quality printed images using computer systems have conventionally taken several approaches. One previous computer system provides print data to the printer driver in one-page increments. Another previous computer system utilizes a banding architecture and divides a print job page into increments called "bands" which are provided to the printer driver.

During the printing process, the printer driver performs a series of discrete functions such as obtaining print data from the host computer system, analyzing and processing the print data, rendering the print data into picture elements, and providing the picture elements to a designated printer. Previous computer systems, however, typically use an "all-or-nothing" printer driver approach to provide print data to the system printer. Conventional printer drivers are unitary devices which perform the various printer driver functions as an indivisible process. This "all-or-nothing" approach frequently results in less than optimal performance when confronted with the heightened technological demands of printing high-resolution color images.

For example, previous computer systems frequently halt system use while the printer driver processes the print job data. This interruption requires the system user to wait until the entire printer driver process is completed before system use can resume. Such interruptions due to printer driver processing time can be both costly and inconvenient. System control, however, could be quickly returned to the user immediately after the print data acquisition function was performed by the printer driver if the print data processing and picture-element rendering functions were performed as separate and discrete printer driver functions.

Previous printer drivers are also somewhat inflexible and awkward because their "all-or-nothing" approach is not conducive to design modularity or distribution of printer driver functions such as print data processing. The increased technological requirements of high-quality printed images make modular inflexibility a significant drawback in a printer driver device. Separating the printer driver into discrete functions might also facilitate use of a multitasking approach to printer control, where an operating system capable of supporting multitasking operations could run several printer driver functions concurrently, thus saving computing time and increasing throughput of print data.

Therefore, an improved system and method is needed to effectively control a computer printer device using a split printer driver to produce high-quality printed images according to the present invention.

SUMMARY OF THE INVENTION

In accordance with the present invention, a system and method are disclosed for using a split printer driver to control a computer printer device. In the preferred embodiment of the present invention, a computer system comprises a split printer driver and a printer device for producing high-quality printed images responsive to print data provided by the computer operating system.

The split printer driver includes a separate page driver which performs a preliminary optimizing procedure on the print data and then stores the optimized print data into a journal file. A journal file processor retrieves the optimized print data from the journal file and supplies it to a separate render driver which is a part of the split printer driver. The separate render driver receives the optimized print data from the journal file processor and processes the optimized print data using an image processor. The processed print data is then rendered into picture elements by the render driver and provided to a spooler accessible by a printer to produce high-quality printed images.

The preferred embodiment of the present invention also comprises a multi-tasking operating system capable of concurrently operating the separate page driver to optimize and store the print data, and operating the separate render driver to process and render the print data into picture elements. The concurrent operation of the page driver functions and the render driver functions using a multi-tasking computer operating system creates a more time-efficient computer printing system and effectively increases printer throughput.

DETAILED DESCRIPTION OF THE PREFERRED EMBODIMENT

A system and method are disclosed herein for using a split printer driver to control a computer printer device. The split printer driver comprises computer software and associated hardware, and includes a page driver to acquire and optimize print data, a journal file for storing the optimized print data, a journal file processor for retrieving the optimized print data from the journal file, and a render driver for processing and rendering the optimized print data into picture elements which are supplied to a computer printer to produce high-quality printed images.

Figure 1:
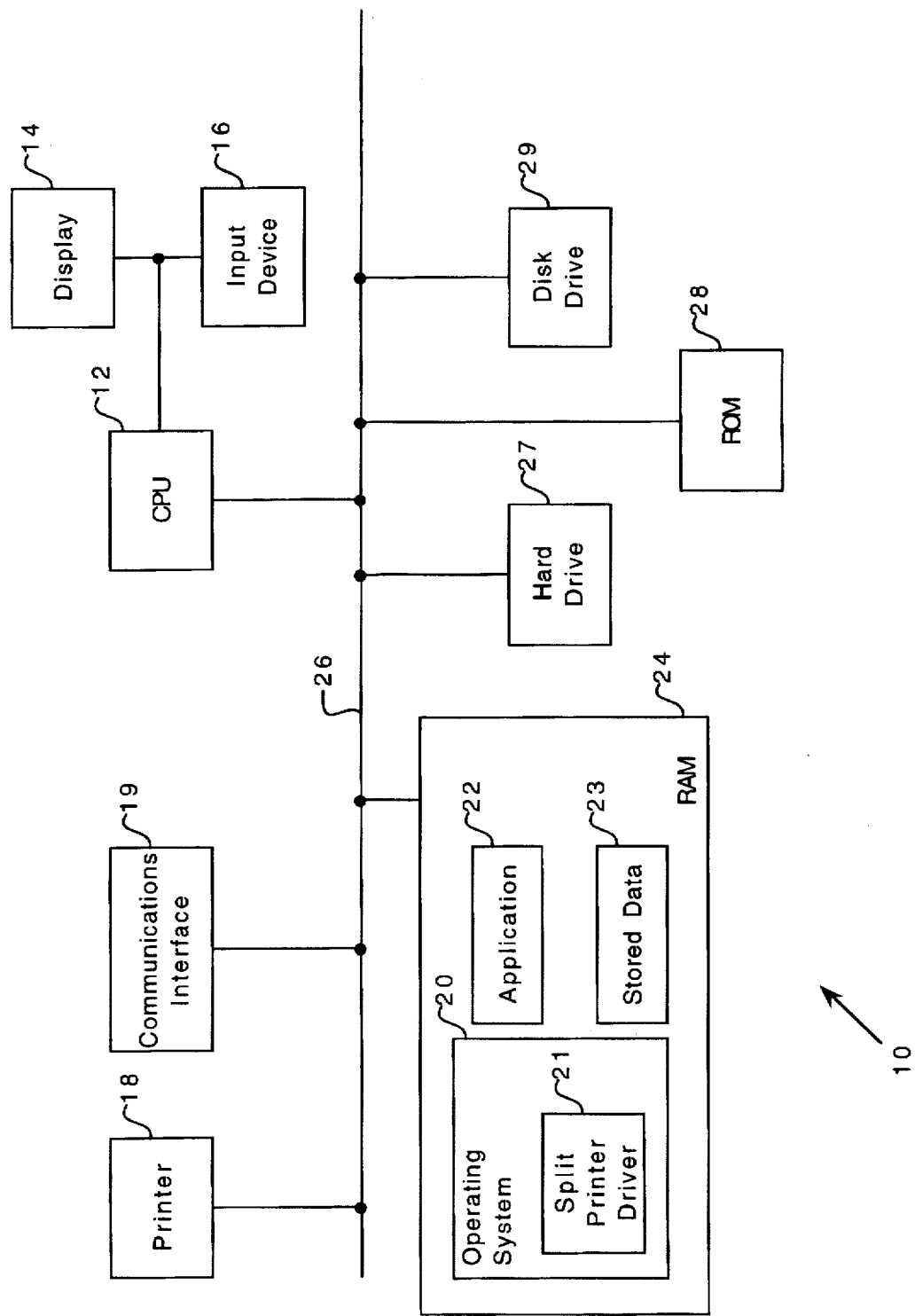
FIG. 1 is a block diagram showing a computer system having a split printer driver according to a preferred embodiment of the present invention.

FIG. 1 is a block diagram of a computer system 10 having a split printer driver 21 according to a preferred embodiment of the present invention. Computer system 10 preferably comprises a central processing unit (CPU) 12, a video display 14, an input device 16, a printer 18, a communications interface 19, a random-access-memory (RAM) 24, a hard drive 27, a read-only-memory (ROM) 28, and a disk drive 29. RAM 24 contains an operating system (O/S) 20, an application program 22, and stored data 23. Each element of computer system 10 preferably has an input and an output coupled to a common system bus 26. Computer system 10 may alternatively include various input devices to input information and to interface with the various system software. Split printer driver 21 resides as part of O/S 20 within RAM 24, and is used by system 10 to control printer 18 and produce high-quality printed images, according to the present invention.

Components of this invention may be conveniently implemented using a conventional general purpose digital computer system 10 programmed according to the teachings of this specification, and appropriate software coding can be readily prepared based on teachings of the present disclosure. The present invention may also be implemented by the preparation of application-specific integrated circuits or by interconnecting an appropriate network of conventional circuits. In the preferred embodiment of the present invention, the split printer driver 21 may take the form of interdependent threads executing on a general purpose computer system 10. These threads permit the system 10 to carry out a split printer driver 21 technique when the system 10 reads and executes their corresponding programming instructions from a computer-readable storage medium. The storage medium containing the thread instructions can include, but is not limited to, any type of disk media including floppy disks, optical disks, CD-ROMs, magneto-optical disks, hard drives or disk arrays, whether located within or external to the processing system. Alternately, the storage medium can include ROM, RAM, EPROM, EEPROM, flash EEPROM or any other type of media suitable for storing computer-readable instructions.

Figure 2:
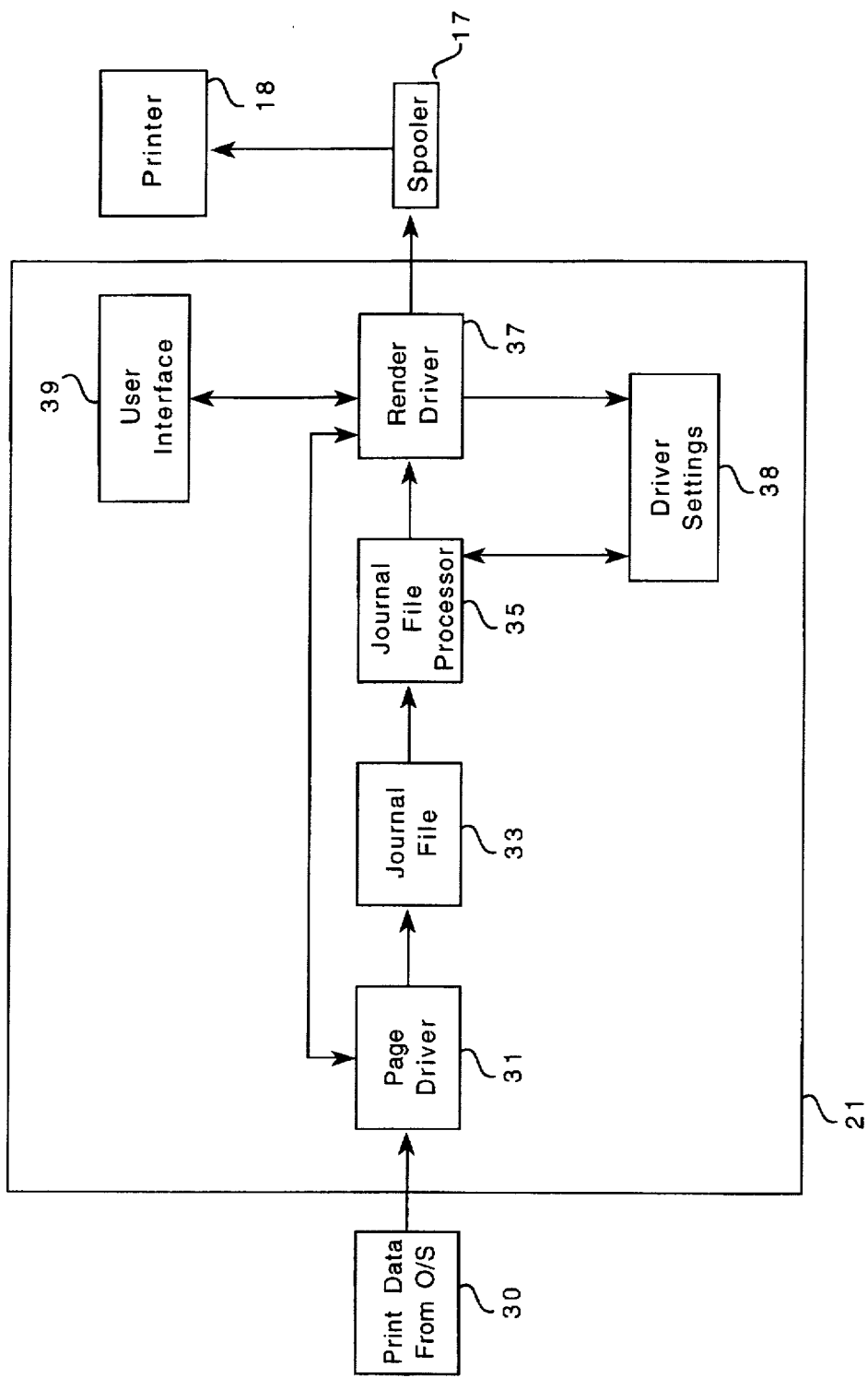
FIG. 2 is a block diagram showing elements of the split printer driver of FIG. 1.

FIG. 2 is a block diagram showing elements of split printer driver 21 according to a preferred embodiment of the present invention. Due to the subdivided structure of the split printer driver 21, the present invention is conducive to design modularity and distribution of printer driver functions such as print data processing. Separating the printer driver 21 into discrete functions also facilitates the use of a multitasking approach to printer control, where an operating system capable of supporting multitasking operations can control several printer driver functions concurrently, thus saving computing time and increasing throughput of print data. The split printer driver 21 also performs a valuable "look ahead" function by causing the page driver 31 to analyze and optimize print data 30. The analysis information is provided to render driver 37 to allow processing and rendering of the picture elements with advance information about the ultimate desired print image. This "look ahead" feature permits split printer driver 21 to function more efficiently and helps produce high-quality printed images, as discussed with reference to FIG. 7.

In FIG. 2, page driver 31 receives print data 30 from the host computer operating system in response to a print command from the system user. Page driver 31 optimizes print data 30 into one-page units, and stores the optimized print data with all drawing commands into journal file 33. Journal file 33 then contains a collection of drawing commands and optimized print data required to render pages of original print data 30.

Journal file processor 35 retrieves the optimized print data from journal file 33 and provides the optimized print data to render driver 37. Journal file processor 35 is also responsive to a set of driver settings 38. Examples of driver settings 38 include print-image resolution, color printing selection, paper type, imageable print area, and various specific printer options. The initial driver settings 38 are provided by render driver 37 and may be subsequently updated by journal file processor 35.

Render driver 37 is connected to user interface (UI) 39 and maintains control over driver settings 38. Render driver 37, however, may indirectly call page driver 31 responsive to a request to post UI 39. UI 39 essentially contains controls enabling a system us to select specific printer functions and options.

Journal file processor 35 provides optimized print data retrieved from journal file 33 to render driver 37 which processes the optimized print data and renders the optimized print data into picture elements. Render driver 37 then provides the rendered picture elements to a printer spooler 17 which printer 18 accesses to produce printed images.

Figure 3:
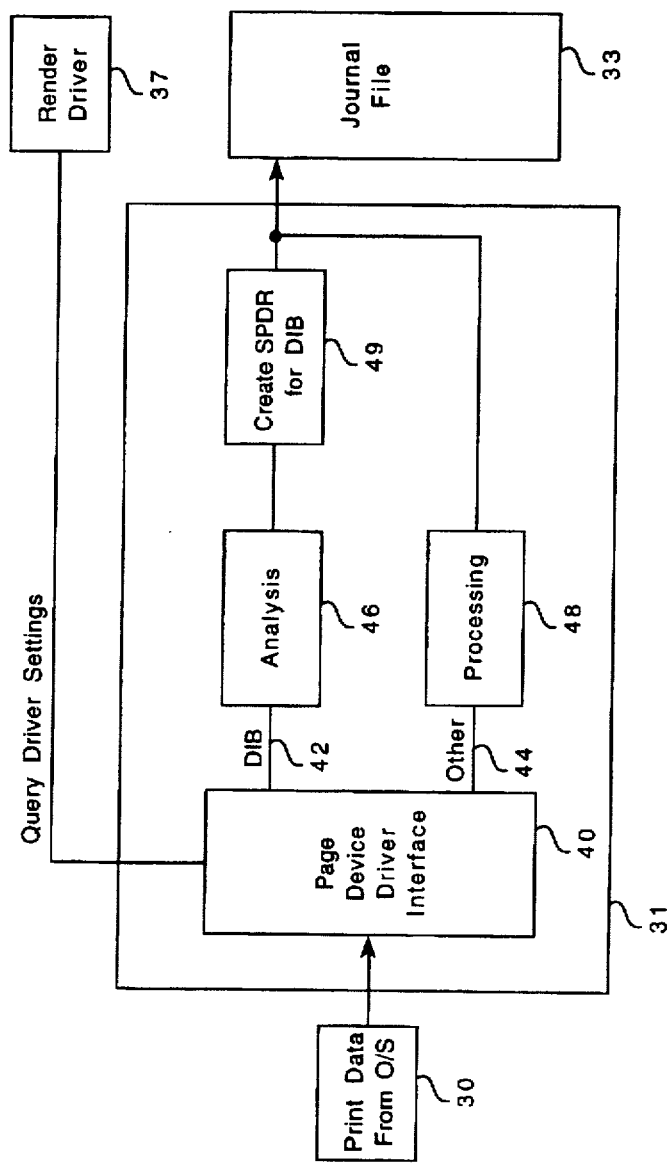
FIG. 3 is a block diagram showing the page driver of the split printer driver of FIG. 2.

FIG. 3 is a block diagram showing page driver 31 of the split printer driver 21 of FIG. 2. In FIG. 3, print data 30 is provided by the host computer operating system 20 to page driver 31 in response to a print command from the system user. Page device driver interface (DDI) 40 receives and separates print data 30 into high-quality device-independent bitmap (DIB) data 42 and other data 44 which includes basic text and graphic primitives. Page DDI 40 also has the ability to query driver settings from render driver 37, including print resolution, paper size, color print selection, or special printer options.

In the preferred embodiment, DIB data 42 and other data 44 are optimized before being stored in journal file 33. The optimization process allows page driver 31 to perform preliminary print data processing and formatting before storing the print data in journal file 33. Specifically, page driver 31 develops a data base collection of all object elements for each individual image of a print job and arranges the object elements in the correct order, including any necessary pointers or tags, before storing the optimized print data in journal file 33. Since the print data 30 has been previously optimized by page driver 31, a straightforward read-function can be used at print data retrieval time.

Other data 44 is processed in block 48 and then stored in journal file 33. DIB data 42 is analyzed in block 46 to determine object type and important attributes such as object type and color information. DIB data 42 is also analyzed to determine whether the analyzed data 42 is part of a larger image. If analysis in block 46 reveals that the analyzed DIB data 42 is part of a larger image, a special identifier is added to link the analyzed DIB data 42 to other related DIB data 42 before storing the analyzed DIB data 42 into a special page data record (SPDR) in block 49. If analysis 46 reveals that the analyzed DIB data 42 is not part of a larger image, the analyzed DIB data 42 is still identified and then stored into a SPDR in block 49.

Figure 4:
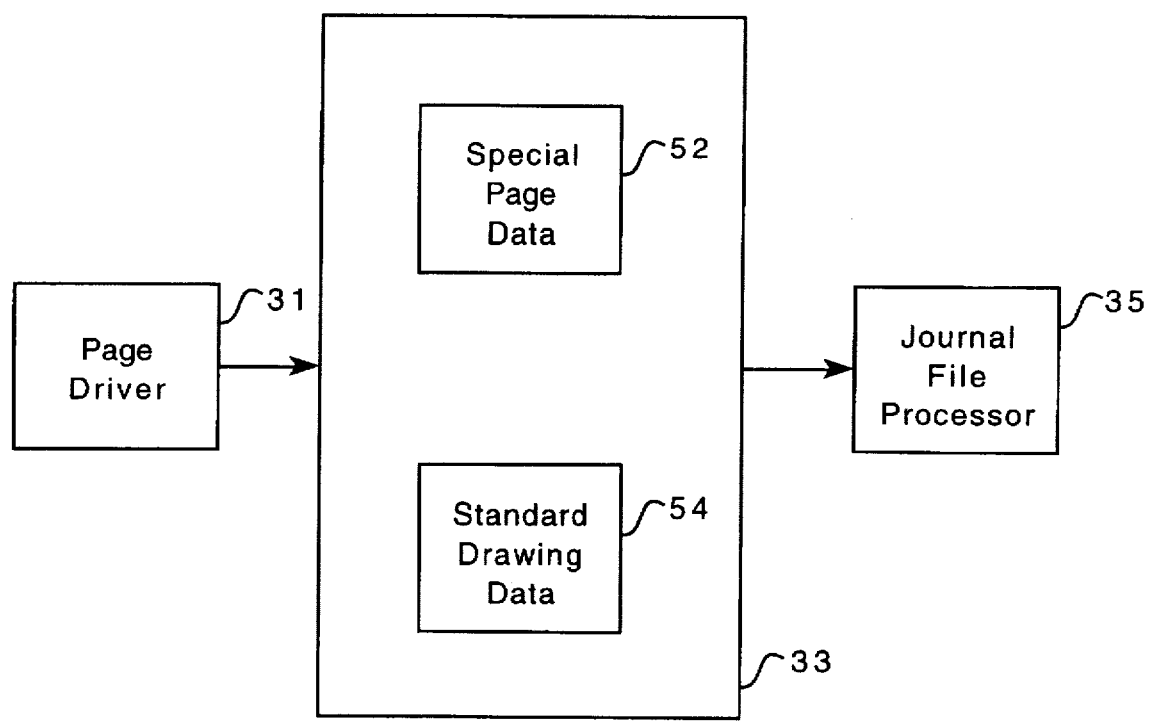
FIG. 4 is a block diagram showing the contents of the split printer driver journal file of FIG. 2.

FIG. 4 is a block diagram showing the contents of the split printer driver journal file 33 according to a preferred embodiment of the present invention. Journal file 33 essentially contains encoded information differentiating print data as either special or standard data. Special data includes the analysis data provided by page driver 31, such as image type, an identifier if the object is part of a larger image, and various image attributes like color information and line thickness.

In FIG. 4, page driver 31 provides optimized print data to journal file 33. Special page data 52 contains a combination of commands and parameters which identify the optimized print data as special in nature, including analysis data discussed in conjunction with FIG. 3 above. Standard drawing data 54 contains drawing calls for standard print jobs, for example, circle primitives, line styles, fill patterns, specifying colors, bit-block transfers, and scaling transformations. Journal file processor 35 thus reads the contents of journal file 33 and differentiates between standard drawing data 54 and special data 52.

Figure 5:
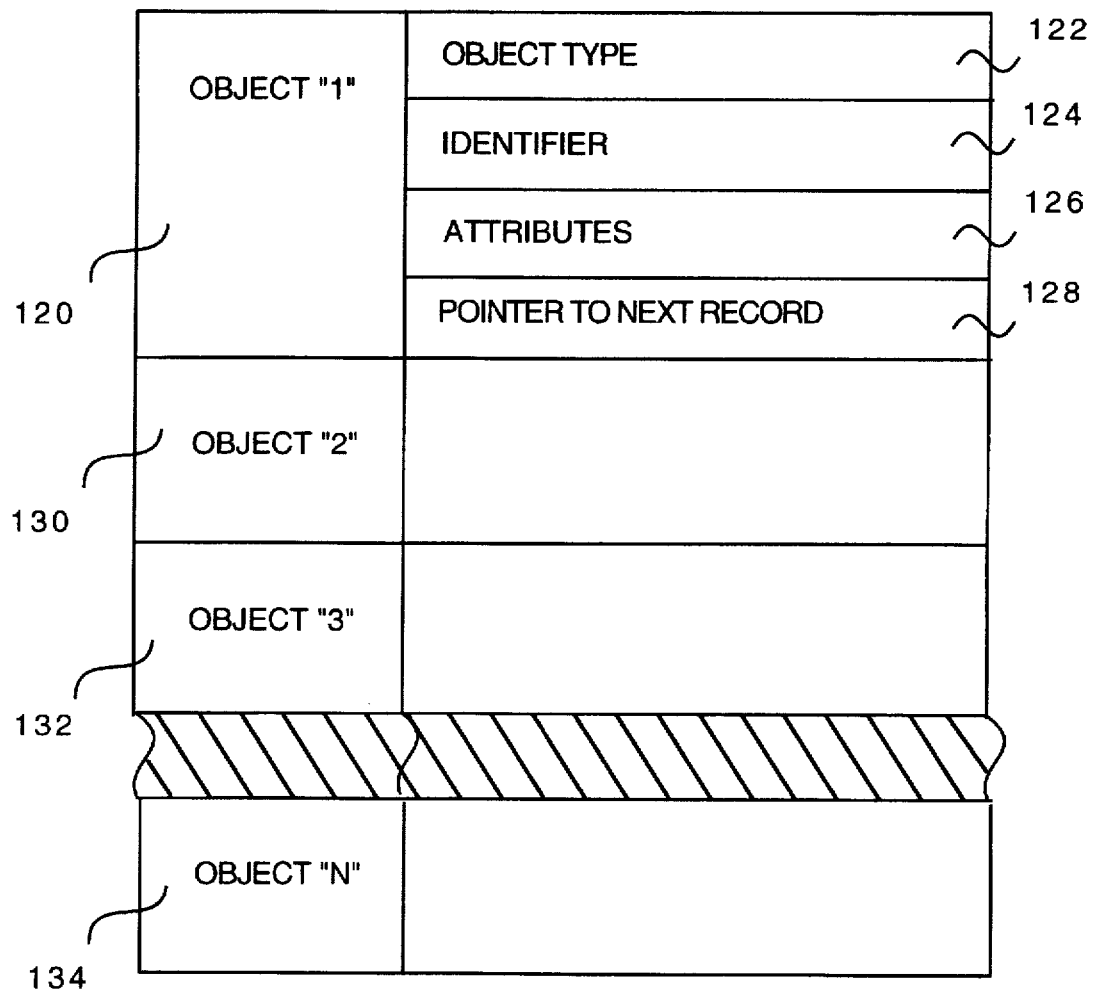
FIG. 5 is a diagram showing a typical memory configuration of special page data stored into the journal file by the page driver.

FIG. 5 is a diagram showing a typical memory configuration of special page data 52 after being stored into journal file 33 by page driver 31. Special page data 52 typically includes a group of special page data records (SPDRs) which contain information used by the present invention to process and render print data 30 into high-quality images. Referring to FIG. 5, object "1" 120 corresponds to a sub-portion of print data 30 received by page driver 31 and include the analysis and optimization information gathered by page driver 31. The FIG. 5 SPDR containing object "1" 120 shows examples of information typically contained in each SPDR. The object which is the subject of a print job is specified in object type 122. Examples of object types include text, device-independent bitmap (DIB), and bit-block transfer. An identifier (ID) 124 is used to identify whether object "1" 120 is part of a larger image. Various attributes 126 are included, such as color information, line thickness, a bounding rectangle for the object, and a pointer to a corresponding standard drawing data 54 record containing non-special print data for object "1" 120. A pointer 128 to the next linked-list record in journal file 33 is also included in each SPDR. Object "2" 130 and object "3" 132, continuing up to an object "n" 134 may also be stored in individual SPDRs within special page data 52 of journal file 33. Each of the SPDRs typically may include an object type 122, an identifier 124, attributes 126, and a pointer 128 as discussed in conjunction with object "1" 120.

Figure 6:
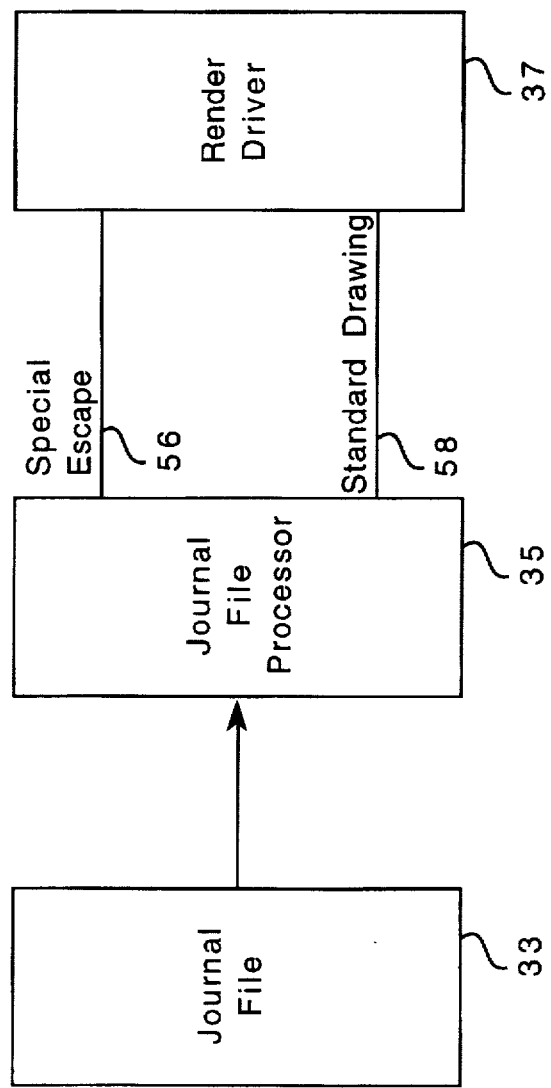
FIG. 6 is a block diagram showing the journal file processor read-mode according to a preferred embodiment of the present invention.

FIG. 6 is a block diagram showing the journal file processor 35 in journal file read-mode according to a preferred embodiment of the present invention. Journal file processor 35 sequentially reads records in journal file 33 and determines whether each record is special page data 52 or standard drawing data 54. In the preferred embodiment, page driver 31 stores each record into journal file 33 with necessary information in the correct sequence, so journal file processor 35 typically performs a straightforward read-function upon each record in journal file 33. Journal file processor 35 then provides a special escape signal 56 to render driver 37 responsive to special data 52 from journal file 33. Special escape signal 56 includes information from the analysis and optimization process performed by page driver 31 and stored in special page data 52. Journal file processor 35 also provides standard drawing signal 58 to render driver 37. Standard drawing signal 58 includes the non-special drawing-call information stored in standard drawing data 54 within journal file 33.

Figure 7:
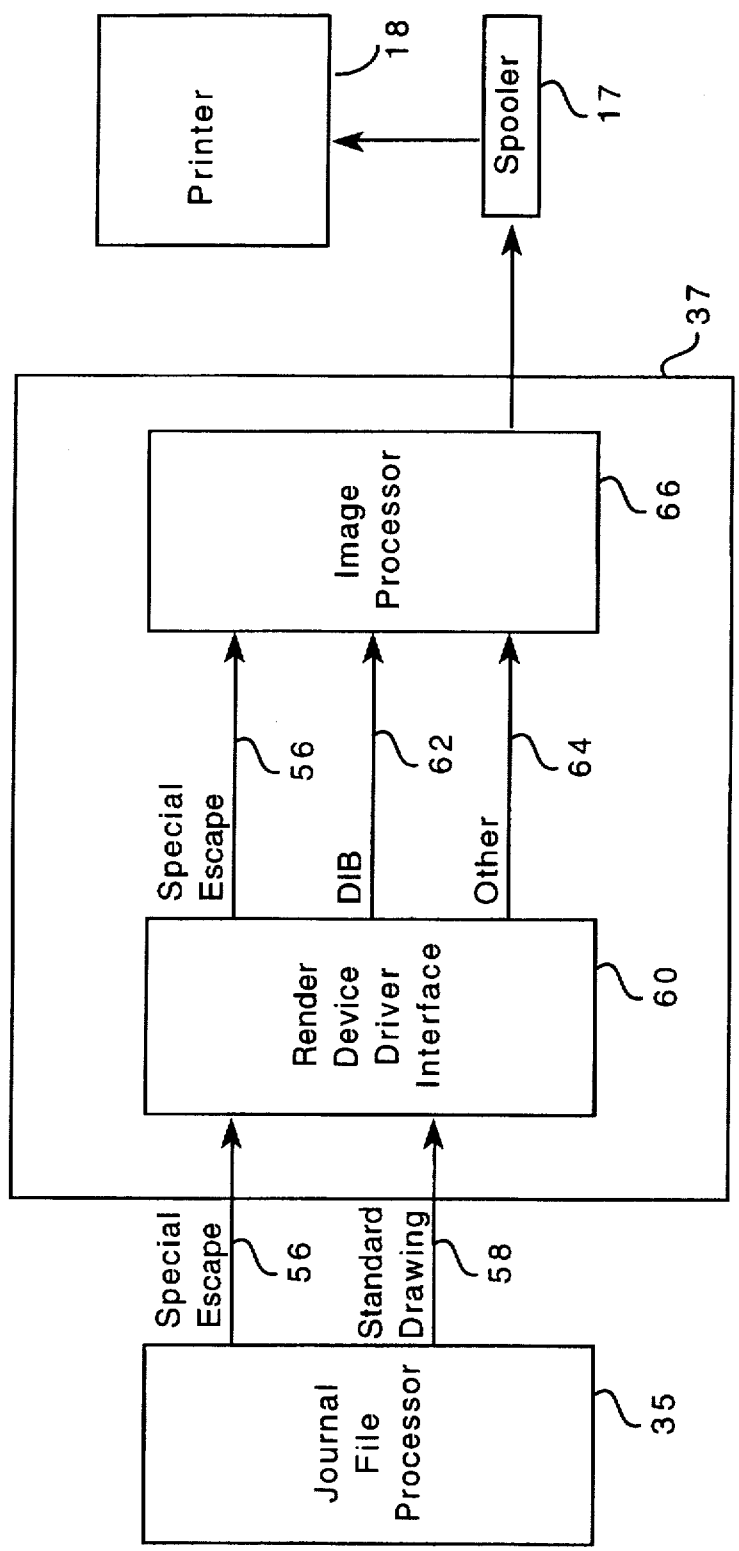
FIG. 7 is a block diagram showing the render driver of the split printer driver of FIG. 2.

FIG. 7 is a block diagram showing render driver 37 of split printer driver 21 according to a preferred embodiment of the present invention. In FIG. 7, journal file processor 35 provides escape signal 56 and standard drawing signal 58 to render device driver interface (DDI) 60 of render driver 37. Standard drawing signal 58 is separated by render DDI 60 into high-quality device independent bitmap (DIB) data 62 and other data 64. Render DDI 60 then provides DIB data 62 and other data 64 to image processor 66. Escape signal 56 is internally passed through render DDI 60 to image processor 66 for use in special picture-element processing and rendering. In general, maximum print quality can be obtained by understanding certain important aspects of print data 30. For example, attributes 126 stored in special page data 52 within journal file 33 may be used to calculate a color gamut for a particular print job. Also, identifier 124 stored in special page data 52 may be used to tell render driver 37 whether a particular object is part of a larger image. This information increases print quality because prior knowledge ("look ahead") of a complete image's contents permits the image processing algorithm of the render driver 37 to function more efficiently. Various types of image processing and rendering of picture elements require information typically not provided by previous printer drivers at the start of the rendering process. The present invention, in contrast, has previously analyzed print data 30, and can provide this extra analysis information to the render driver as a "look ahead" via special escape signal 56.

Image processor 66 can operate in a number of different modes, including a bypass mode, a full-band mode, and a high-quality device independent bitmap (DIB) mode. Image processor 66 transforms various image types into a consistent conventional format that is compatible with printer 18, and also performs various image processing functions, such as color processing and dithering. In full-band mode, data is initially rendered into picture elements and then processed. In DIB mode, data is processed and then rendered into picture elements to allow greater flexibility in processing the data. Escape signal 56 is used by image processor 66 to affect special processing and rendering of picture elements. After processing and rendering the picture elements, render driver 37 provides the picture elements to a spooler 17 which may then be accessed by printer 18 to produce printed images.

Figure 8:
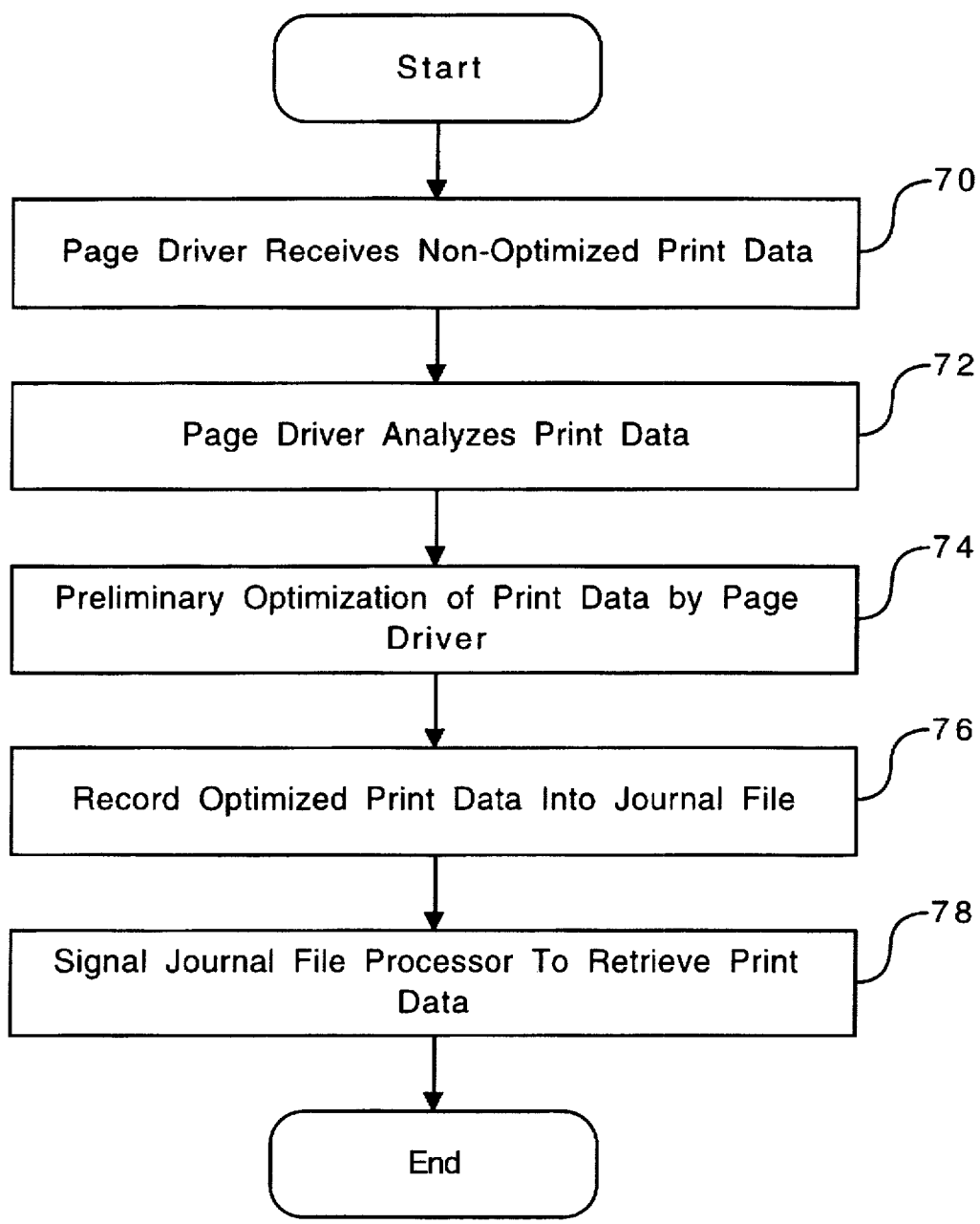
FIG. 8 is a flowchart showing process steps for print data acquisition, analysis, optimization, and storage by the page driver according to a preferred embodiment of the present invention.

FIG. 8 is a flowchart showing process steps for print data 30 acquisition, analysis, optimization, and storage by the page driver 31 according to a preferred embodiment of the present invention. The page driver 31, in step 70, receives non-optimized print data 30 from a host computer operating system 20 in response to a print command issued by the system user. In step 72, the page driver 31 analyses the received print data 30 and separates high-quality device-independent bitmap (DIB) data 42 from other data 44. In step 74, the received print data 30 is subject to preliminary optimization by the page driver 31. The optimized print data, in step 76, is recorded into the journal file 33 by the page driver 31. In step 78, the page driver 31 then signals the journal file processor 35 that the optimized and stored print data is ready to be retrieved, rendered into picture elements, and then printed.

Figure 9:
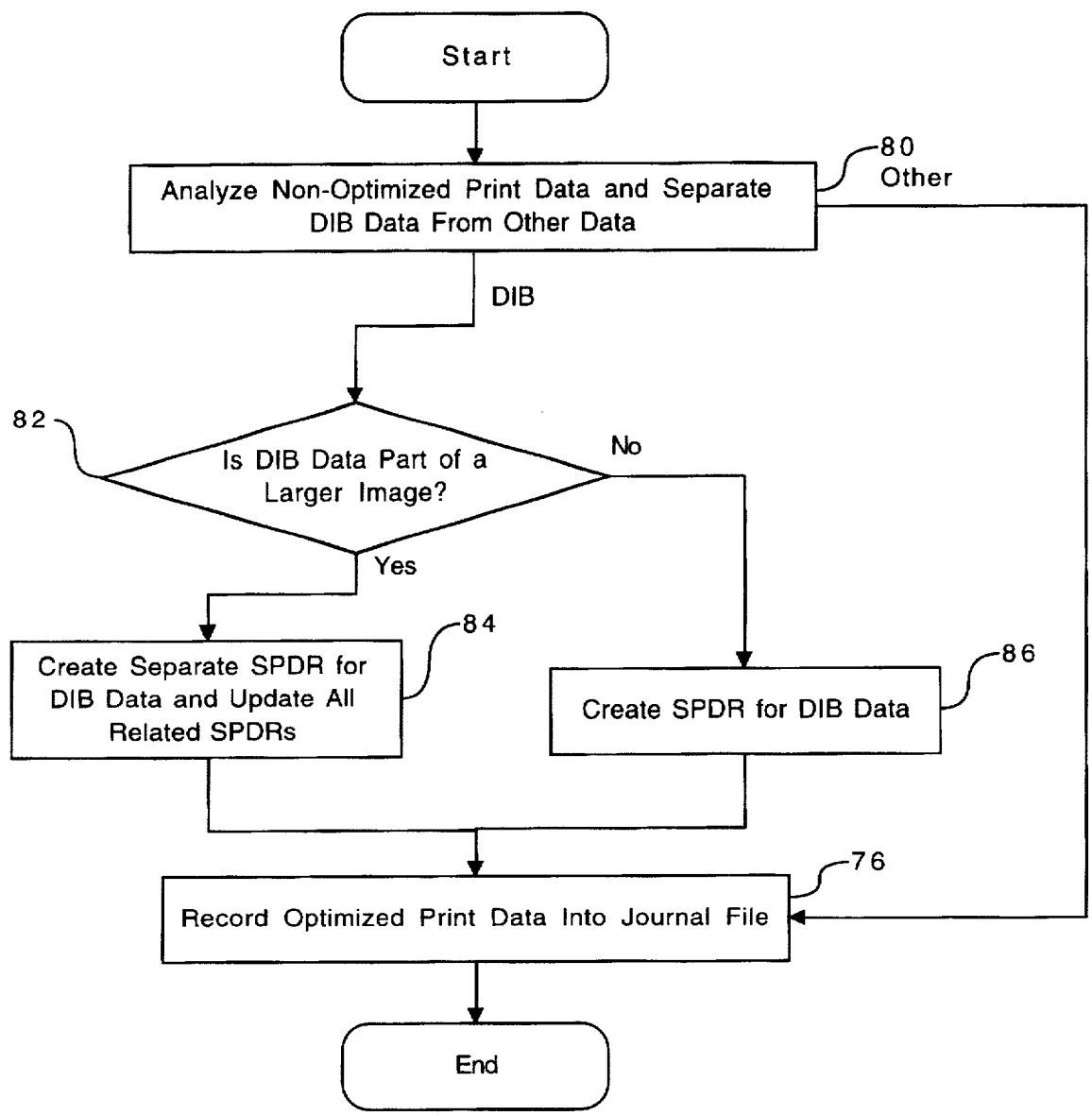
FIG. 9 is a flowchart showing detailed process step for analyzing, optimizing, and storing print data by the page driver according to a preferred embodiment of the present invention.

FIG. 9 is a flowchart showing detailed process steps for analyzing, optimizing, and storing print data 30 by the page driver 31 according to a preferred embodiment of the present invention. The FIG. 9 process presents the analyzing step (72) and the optimizing step (74) of FIG. 7 in greater detail. In step 80, page driver 31 performs object analysis on the print data 30 received from the host computer operating system 20 and separates the print data 30 into high-quality device-independent bitmap (DIB) data 42 and other data 44. The page driver 31, in step 82, determines whether the analyzed DIB data 42 is part of a larger image. If the DIB data 42 is part of a larger image, step 84 creates a separate special page data record (SPDR) for the DIB data 42 and updates all related SPDRs to identify all related SPDRs as part of a larger image. If the DIB data 42 is not part of a larger image, step 86 creates a SPDR for the DIB data 42. Step 76 (FIGS. 8 and 9) records the optimized print data into the journal file 33, including DIB data from steps 84 and 86 and other data from step 80. In the preferred embodiment, other data from step 80 may be optimized or processed before being recorded into the journal file 33 during step 76.

Figure 10:
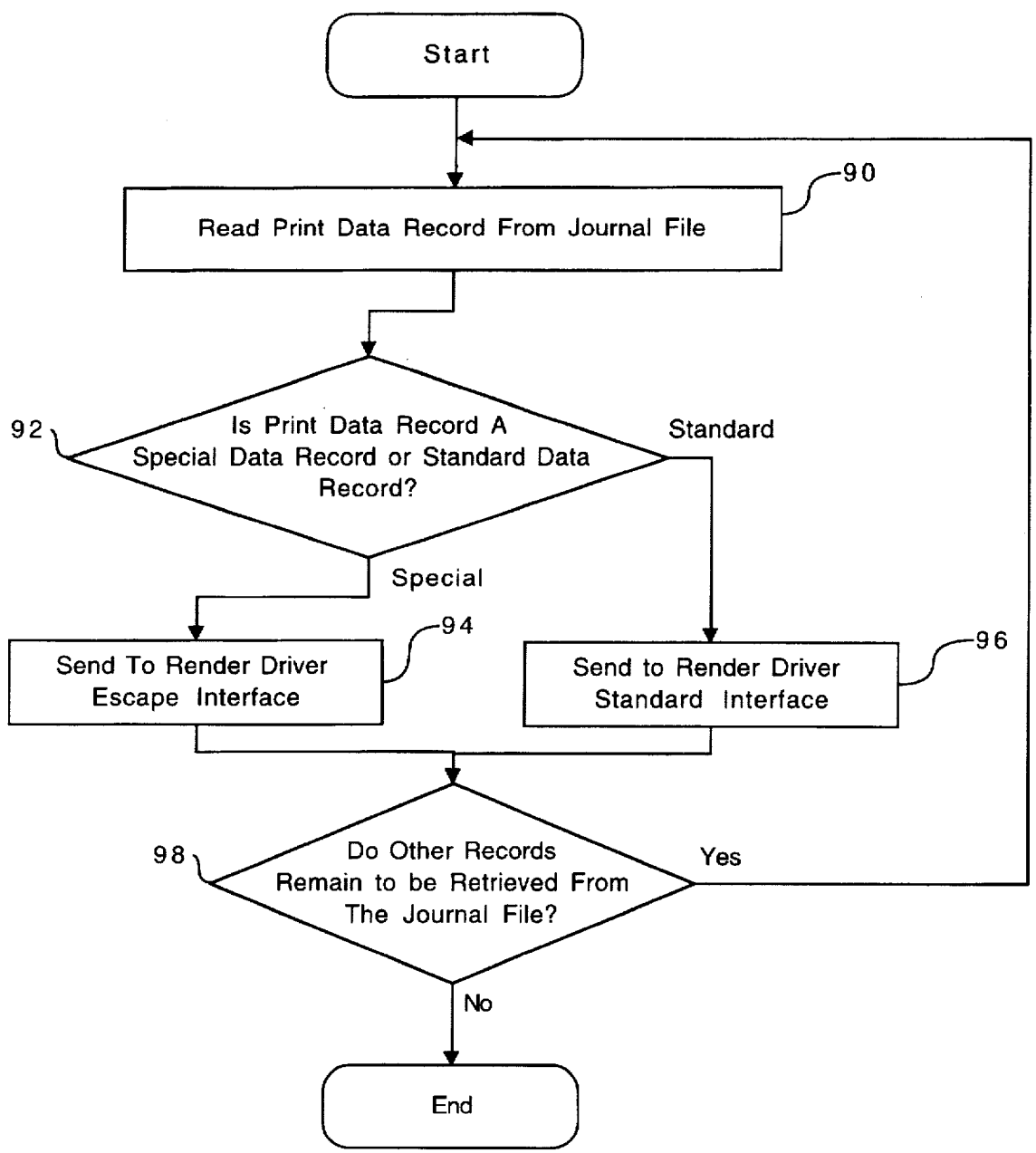
FIG. 10 is a flowchart showing journal file processor steps for reading optimized print data from the journal file and providing the optimized print data to the render driver.

FIG. 10 is a flowchart showing journal file processor 35 steps for reading optimized print data from the journal file 33 and providing the print data to the render driver 37. The journal file processor 35, in step 90, retrieves an individual print data record from the journal file 33. In step 92, the journal file processor 35 determines whether the print data record is special page data 52 or standard drawing data 54. The journal file processor, in step 94, responsive to the special page data 52 provides a special escape signal 56 to a special escape interface on the render driver 37. The journal file processor 35, in step 96, responsive to the standard drawing data 54 provides a standard drawing signal 58 to a standard interface on the render driver 37. In step 98, the journal file processor 35 determines whether other journal file records remain to be retrieved from the journal file 33. If other records remain, step 98 returns the process to step 90 and repeats the FIG. 10 process steps. If no other records remain, the FIG. 10 process is exited.

Figure 11:
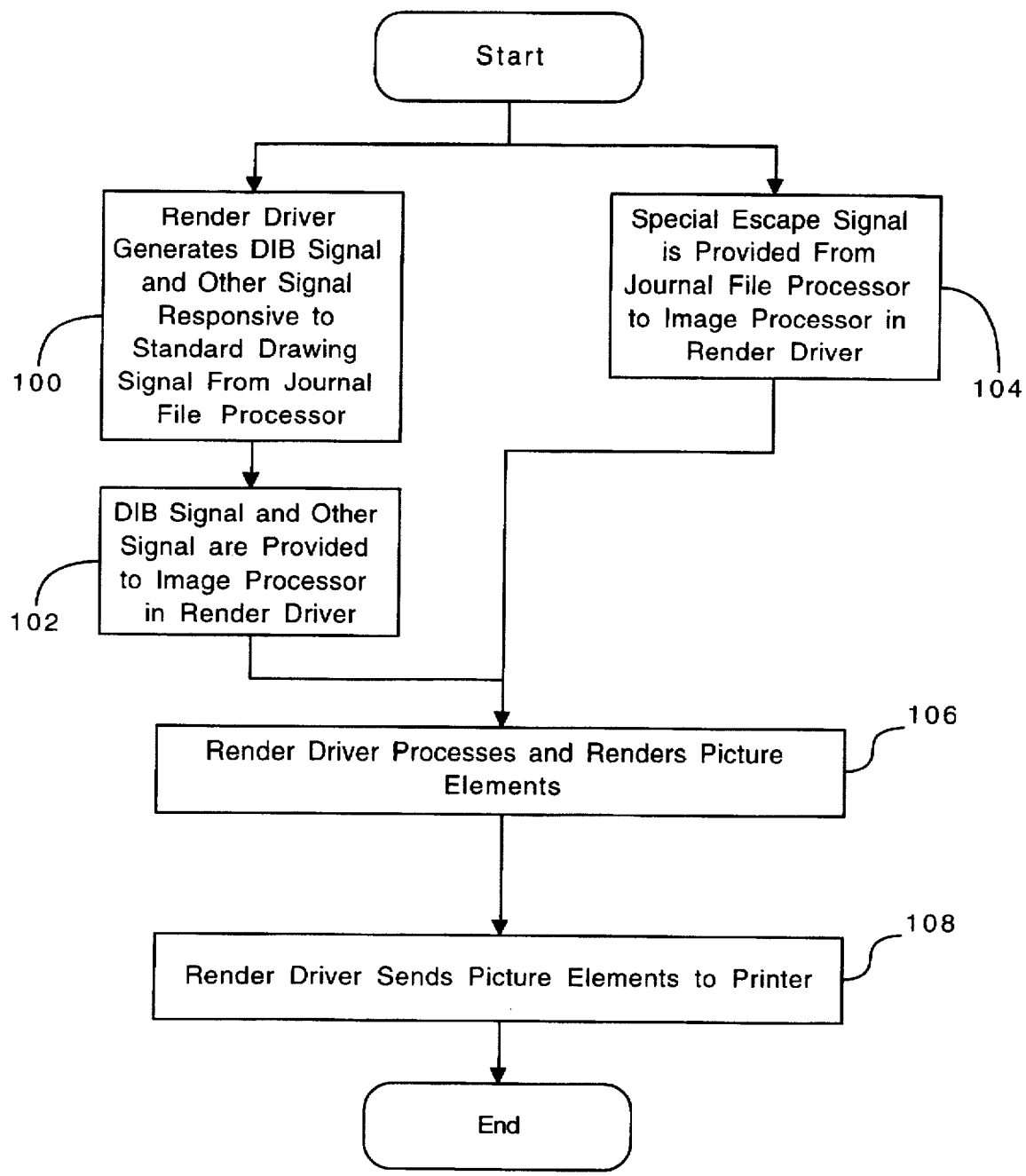
FIG. 11 is a flowchart showing render driver process steps for processing and rendering print data into picture elements and providing the picture elements to a printer.

FIG. 11 is a flowchart of render driver 37 steps for processing and rendering print data into picture elements and providing the picture elements to a printer 18. The render driver 37, in step 100, generates a high-quality device-independent bitmap (DIB) signal 62 and other signal 64 responsive to the standard drawing signal 58 provided by the journal file processor 35. In step 102, the render driver 37 provides the DIB signal 62 and the other signal 64 to an image processor 66 within the render driver 37 for image processing, such as dithering or color processing. In step 104, the render driver 37 provides a special escape signal 56 from the journal file processor 35 to the image processor 66 for use in special processing and rendering of the picture elements. The render driver 37, in step 106, processes and renders the print data into picture elements. In the preferred embodiment, the DIB signal 62 is processed prior to rendering, whereas the other signal 64 may be rendered into picture elements prior to when processing occurs. In step 108, the rendered picture elements are sent to a printer spooler 17 which may be accessed by a printer 18 to produce high-quality printed images according to the present invention.

Figure 12:
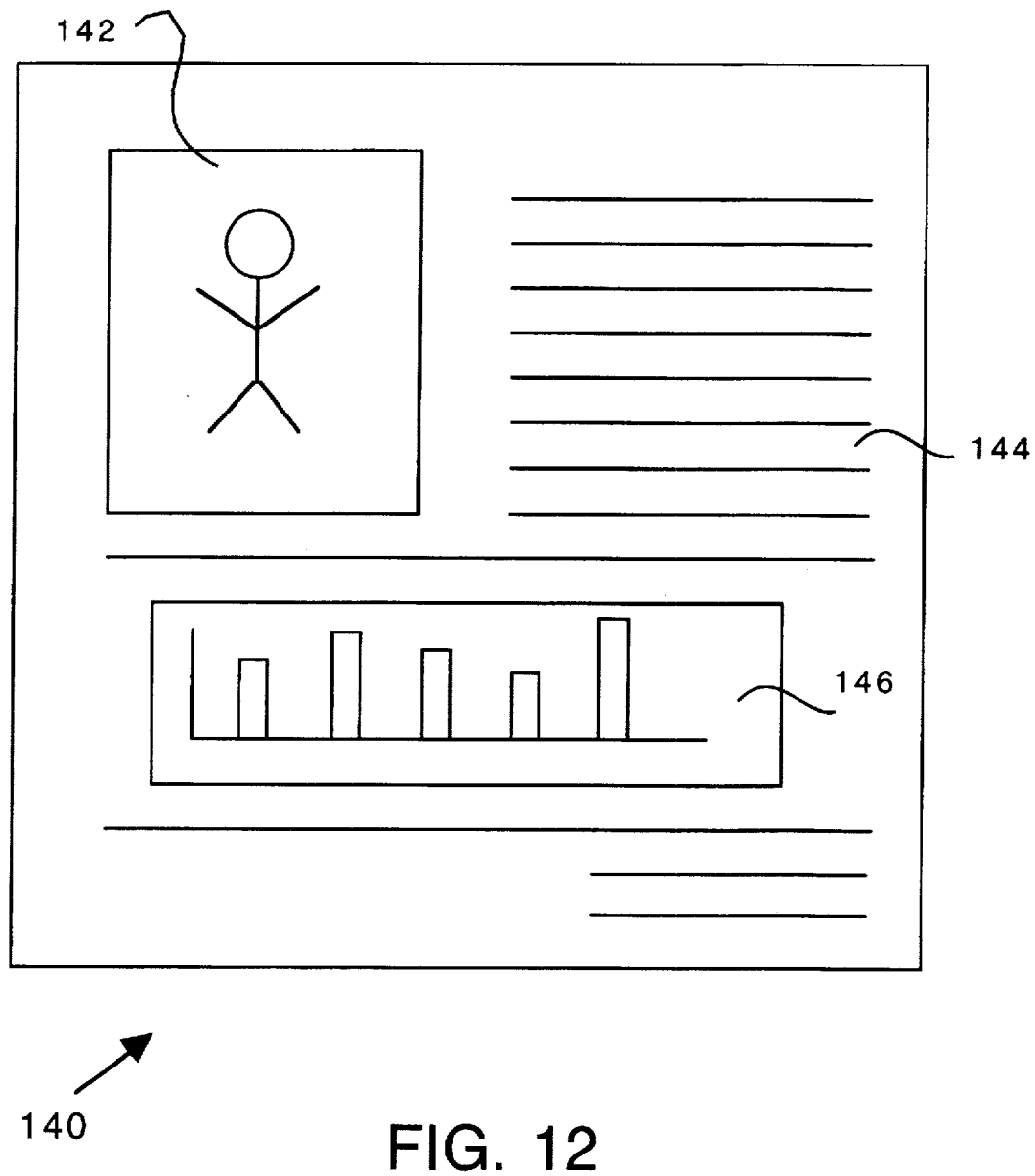
FIG. 12 is a drawing of a print job example consisting of a newsletter including text, a device-independent bitmap, and graphics.

FIG. 12 is a drawing of a sample print job consisting of a model newsletter 140 which will serve as an example to illustrate the basic operation of split printer driver 21. Model newsletter 140 includes a device-independent bitmap (DIB) 142 depicting a person waving, various lines of text 144, and a graphic 146 showing a bar chart.

In the preferred embodiment, when a system user issues a command to print newsletter 140, operating system 20 of computer system 10 provides the corresponding newsletter print data 30 to page driver 31 of split printer driver 21. The format of print data 30 depends primarily upon the host computer system 10 and its operating system 20. Typically, print data 30 will either be in page format, where print data 30 is provided to page driver 31 in one-page increments, or in a banding format which divides a print job page into increments called "bands". Further, for reasons such as memory conservation, the sequence of print data 30 may not follow the physical layout (top-to-bottom and left-to-right) of newsletter 140. Instead, operating system 20 may, for example, first send DIB 142 in three banded segments, followed by text 144 divided into a number of bands, and finally, send graphic 146 using two banded segments.

Render driver 37 must render picture elements and provide them to printer 18 in a sequence which follows the physical layout of newsletter 140 (top-to-bottom, and left-to-right). Therefore, the present invention uses page driver 31 to analyze and optimize print data 30, and then to record the optimized print data into journal file 33 in special page data records (SPDRs) located within special page data 52.

For example, DIB 142 of newsletter 140 could be optimized by page driver 31 and recorded in journal file 33 in three separate SPDRs corresponding roughly to the top, middle, and bottom of DIB 142. Each DIB 142 SPDR would include an identifier 124 signifying the SPDRs are part of the larger image of DIB 142. The SPDRs each also contain a pointer 128 indicating which SPDR should be read next, during the retrieval sequence performed by journal file processor 35. Page driver 31 also analyzes DIB 142 and stores the analysis data in the DIB 142 SPDRs. Examples of such analysis data include object type 122 (such as DIB, text, bit-block transfer, or polygon), and attributes 126 (such as color information, line thickness, bounding rectangles, and a pointer connecting special page data 52 to related standard drawing data 54). In the newsletter 142 example, the optimization and analysis process described in conjunction with DIB 142 would also be performed on text 144 and graphic 146, resulting in optimization, analysis, and storage of print data 30 for the entire newsletter 140. The special analysis and optimization data is stored in special page data 52 of journal file 33, and standard drawing calls are stored in standard drawing data 54 of journal file 33.

Page driver 31 then signals journal file processor 35 to retrieve the SPDRs from journal file 33 and provide them to render driver 37. Journal file processor 35 reads each SPDR in sequence, and then sends standard drawing data 54 to a render driver 37 standard interface via standard drawing signal 58, and also sends special page data 52 to a render driver 37 escape interface via escape signal 56. Render driver 37 processes and renders the retrieved print data into picture elements using the special escape signal 56. Special escape signal 56 allows render driver 37 to obtain the results of the optimization and analysis procedure previously performed by page driver 31. The special escape signal 56 can provide information like object type 122, identifier 124 showing related parts of an image, and attributes (such as color information, line thickness, and bounding rectangles). This "look ahead" function allows render driver 37 to more efficiently process and render the print data because, rather than beginning to blindly render picture elements, render driver 37 has advance information about the ultimate desired print image. Render driver 37 processes and renders sample newsletter 140 into picture elements and provides the elements in the correct sequence to spooler 17 which is accessible by printer 18 to produce high-quality printed images according to the present invention.

The invention has been explained above with reference to a preferred embodiment. Other embodiments will be apparent to those skilled in the art in light of this disclosure. For example, the journal file 33 could be implemented using a variety of different storage devices, including the system hard drive 27, the system RAM 24, or a discrete journal file storage device. Further, the present invention page driver 31 function of optimizing and storing print data 30, and the render driver 37 function of processing and rendering the picture elements may either operate sequentially, or they may operate concurrently as independently executable threads or execution modules, providing that the host operating system 30 is capable of supporting cooperative or preemptive multi-tasking operations. Operating the page driver 31 and the render driver 37 as concurrent processes using a multi-tasking operating system results in a more time-efficient printing system and significantly increases printer throughput.

Therefore, these and other variations upon the preferred embodiments are intended to be covered by the present invention, which is limited only by the appended claims.

What is claimed is:

1. A computer system comprising:
   a processor for controlling the computer system;
   a printer driver coupled to the processor for receiving print data, said printer driver further comprising a plurality of independently executable threads including:
      a separate page driver for optimizing and storing the received print data, and
      a separate render driver coupled to the page driver for rendering the stored print data into picture elements;
   a printer coupled to the printer driver for producing printed images from the picture elements; and
   a multi-tasking computer operating system for controlling said page driver to optimize the print data, and for concurrently controlling said render driver to render the optimized print data into picture elements.

2. The computer system of claim 1, wherein the page driver further comprises:
   means for analyzing the print data to determine whether the print data is a device-independent bitmap; and
   means for creating a special page data record including an identifier showing whether the device-independent bitmap is part of a larger image.

3. The computer system of claim 1, wherein the render driver further comprises an image processor to perform image processing on the optimized print data.

4. The computer system of claim 1, wherein the printer driver further comprises a journal file for storing the optimized print data.

5. An output device comprising:
   split printer driver means comprising a plurality of independently executable threads including:
      a separate page driver for optimizing print data,
      a journal file for storing the optimized print data,
      a journal file processor for retrieving the optimized print data, and
      a separate render driver for rendering the optimized print data into picture elements;
      a printer responsive to said split printer driver for producing printed images from said picture elements; and
   a multi-tasking computer operating system for controlling said page driver to optimize the print data, and for concurrently controlling said render driver to render the optimized print data into picture elements.

6. The output device of claim 5, wherein the page driver further comprises:
   means for analyzing the print data to determine whether the print data is a device-independent bitmap; and
   means for creating a special page data record including an identifier showing whether the device-independent bitmap is part of a larger image.

7. The output device of claim 5, wherein the render driver further comprises an image processor to perform image processing on the optimized print data.

8. A method using a split printer driver comprising a plurality of independently executable threads to control a computer printer comprising the steps of:
   optimizing and storing print data;
   retrieving the optimized print data;
   rendering the optimized print data into picture elements; and
   providing the picture elements to the computer printer to produce printed images;
   wherein a multi-tasking computer operating system controls the step of optimizing and storing print data, and concurrently controls the step of rendering the optimized print data into picture elements.

9. The method of claim 8, wherein the step of optimizing and storing print data further comprises the steps of:
   analyzing the print data to determine whether the print data is a device-independent bitmap; and
   creating a special page data record including an identifier showing whether the device-independent bitmap is part of a larger image.

10. The method of claim 8, wherein the step of rendering the optimized print data further comprises the step of processing the optimized print data using an image processor.

11. A computer-usable medium having computer-readable program code embodied therein for causing a computer system having a processor, a display, an input device, a memory, a printer, and a split printer driver comprising a plurality of independently executable threads to perform the steps of:

optimizing and storing print data;

retrieving the optimized print data;

rendering the optimized print data into picture elements; and providing the picture elements to the printer to produce printed images;

wherein a multi-tasking computer operating system controls the step of optimizing and storing print data, and concurrently controls the step of rendering the optimized print data into picture elements.

12. The computer-usable medium of claim 11, wherein the step of optimizing and storing print data further comprises the steps of:

analyzing the print data to determine whether the print data is a device-independent bitmap;

creating a special page data record including an identifier showing whether the device-independent bitmap is part of a larger image.

13. The computer-usable medium of claim 11, wherein the step of rendering the optimized print data further comprises the step of processing the optimized print data using an image processor.

14. An output device comprising:

separate means for optimizing and storing print data;

means for retrieving the optimized print data;

separate means for rendering the optimized print data into picture elements;

means for producing printed images responsive to said picture elements and a multi-tasking computer operating system for controlling said means for optimizing and storing print data, and concurrently controlling said means for rendering the optimized print data into picture elements.

15. The output device of claim 14, wherein means for optimizing and storing print data further comprises:

means for analyzing the print data to determine whether the print data is a device-independent bitmap;

means for creating a special page data record including an identifier showing whether the device-independent bitmap is part of a larger image.

16. The output device of claim 14, wherein the means for rendering the optimized print data includes an image processor for performing image processing upon the optimized print data.

17. The output device of claim 14, further comprising multi-tasking operating system means for controlling the means for optimizing print data, and for concurrently controlling the means for rendering the optimized print data into picture elements.

* * * * *